(12) United States Patent
Olson

(10) Patent No.: US 7,874,226 B2
(45) Date of Patent: Jan. 25, 2011

(54) TRANSMISSION HEATER SYSTEM AND METHOD

(75) Inventor: Bret M. Olson, Canton, MI (US)

(73) Assignee: GM Global Technology Operations LLC, Detroit, MI (US)

(*) Notice: Subject to any disclaimer, the term of this patent is extended or adjusted under 35 U.S.C. 154(b) by 846 days.

(21) Appl. No.: 11/832,573

(22) Filed: Aug. 1, 2007

(65) Prior Publication Data
US 2009/0036268 A1 Feb. 5, 2009

(51) Int. Cl.
*F16H 61/00* (2006.01)
(52) U.S. Cl. .................... 74/336 R; 475/117
(58) Field of Classification Search .................. 475/117
See application file for complete search history.

(56) References Cited

U.S. PATENT DOCUMENTS 5,803,863 A * 9/1998 Hayward et al. ............. 477/98
6,641,498 B2 * 11/2003 Okuwaki .................... 475/117

* cited by examiner

*Primary Examiner*—David D Le
*Assistant Examiner*—Erin D Bishop

(57) ABSTRACT

A method for heating a transmission is provided. The transmission has at least one solenoid valve that hydraulically actuates a valve. The method includes the steps of measuring a transmission temperature, determining whether the transmission temperature is greater than or equal to a desired operating temperature, determining a currently selected gear ratio of the transmission, and overdriving at least one solenoid valve if the transmission has not achieved the desired operating temperature and if overdriving the solenoid valve will not disrupt the operation of the transmission for the currently selected gear ratio.

24 Claims, 4 Drawing Sheets

| | SOLENOID | C1 VBS | C2/C5 VBS | C3 VBS | C4 VBS | LINE VBS | TCC VBS | SOLENOID 2 | SOLENOID 3 |
|---|---|---|---|---|---|---|---|---|---|
| PARK | LIMITATIONS | NORMALLY LOW HYDRAULICALY ISOLATED | NORMALLY HIGH SOLENOID CONTROLLING | NORMALLY HIGH SOLENOID OFF | NORMALLY LOW HYDRAULICALY ISOLATED | ONLY DURING MINIMUM LINE PRESSURE | LUBE DEPENDENT, NO TCC APPLY | ON | ON |
| REVERSE | LIMITATIONS | NORMALLY LOW HYDRAULICALY ISOLATED | NORMALLY HIGH SOLENOID CONTROLLING | NORMALLY HIGH SOLENOID CONTROLLING | NORMALLY LOW HYDRAULICALY ISOLATED | ONLY DURING MINIMUM LINE PRESSURE | LUBE DEPENDENT, NO TCC APPLY | ON | ON |
| NEUTRAL | LIMITATIONS | NORMALLY LOW HYDRAULICALY ISOLATED | NORMALLY HIGH SOLENOID CONTROLLING | NORMALLY HIGH SOLENOID OFF | NORMALLY LOW HYDRAULICALY ISOLATED | ONLY DURING MINIMUM LINE PRESSURE | LUBE DEPENDENT, NO TCC APPLY | ON | ON |
| 1ST BRAKING | LIMITATIONS | NORMALLY LOW AFTER APPLY | NORMALLY HIGH SOLENOID CONTROLLING | NORMALLY HIGH SOLENOID OFF | NORMALLY LOW SOLENOID OFF | ONLY DURING MINIMUM LINE PRESSURE | LUBE DEPENDENT, NO TCC APPLY | ON | ON |
| 1ST | LIMITATIONS | NORMALLY LOW AFTER APPLY | NORMALLY HIGH SOLENOID CONTROLLING | NORMALLY HIGH SOLENOID OFF | NORMALLY LOW SOLENOID OFF | ONLY DURING MINIMUM LINE PRESSURE | DURING FULL LOCK | DURING FULL LOCK OR TCC OFF | ON |

FIG. 4A

| | SOLENOID | C1 VBS | C2/C5 VBS | C3 VBS | C4 VBS | LINE VBS | TCC VBS | SOLENOID 2 | SOLENOID 3 |
|---|---|---|---|---|---|---|---|---|---|
| 2ND | LIMITATIONS | NORMALLY LOW AFTER APPLY | NORMALLY HIGH SOLENOID OFF | NORMALLY HIGH SOLENOID OFF | NORMALLY LOW AFTER APPLY | ONLY DURING MINIMUM LINE PRESSURE | DURING FULL LOCK | DURING FULL LOCK OR TCC OFF | ON |
| 3RD | LIMITATIONS | NORMALLY LOW AFTER APPLY | NORMALLY HIGH SOLENOID OFF | NORMALLY HIGH SOLENOID CONTROLLING | NORMALLY LOW SOLENOID OFF | ONLY DURING MINIMUM LINE PRESSURE | DURING FULL LOCK | DURING FULL LOCK OR TCC OFF | ON |
| 4TH | LIMITATIONS | NORMALLY LOW AFTER APPLY | NORMALLY HIGH SOLENOID CONTROLLING | NORMALLY HIGH SOLENOID OFF | NORMALLY LOW SOLENOID OFF | ONLY DURING MINIMUM LINE PRESSURE | DURING FULL LOCK | DURING FULL LOCK OR TCC OFF | ON |
| 5TH | LIMITATIONS | NORMALLY LOW SOLENOID OFF | NORMALLY HIGH SOLENOID CONTROLLING | NORMALLY HIGH SOLENOID CONTROLLING | NORMALLY LOW SOLENOID OFF | ONLY DURING MINIMUM LINE PRESSURE | DURING FULL LOCK | DURING FULL LOCK OR TCC OFF | ON |
| 6TH | LIMITATIONS | NORMALLY LOW SOLENOID OFF | NORMALLY HIGH SOLENOID CONTROLLING | NORMALLY HIGH SOLENOID OFF | NORMALLY LOW AFTER APPLY | ONLY DURING MINIMUM LINE PRESSURE | DURING FULL LOCK | DURING FULL LOCK OR TCC OFF | ON |

[ ] INDICATES OVERDRIVEN

FIG. 4B

TRANSMISSION HEATER SYSTEM AND METHOD

FIELD

The present disclosure relates to transmissions, and more particularly to a transmission heater system and method.

BACKGROUND

The statements in this section merely provide background information related to the present disclosure and may or may not constitute prior art.

A typical transmission in a motor vehicle runs at peak efficiency when at an elevated temperature, anywhere from 25 to 90 degrees Celsius. However, when a motor vehicle is first started and has not been warmed up, it will take time for the transmission to warm up and reach an ideal operating temperature, perhaps taking as long as 25 minutes of continuous operation. During the warm up, the transmission suffers from inefficiencies such as spin loss.

Various devices have been employed to attempt to reduce the warm up time by increasing the temperature of the transmission. For example, heat exchangers, bypass valves, and oil pan heaters have been employed to provide heat to the transmission. However, these devices are limited by when and by how much heat can be extracted from the engine. Additionally, these devices require additional transmission and vehicle content. Accordingly, there is room in the art for a system and method of heating a transmission without adding additional components.

SUMMARY

The present invention provides a system for heating a transmission.

In one aspect of the present invention at least one regulator valve is in selective hydraulic communication with a torque transmitting device. At least one solenoid valve is in hydraulic communication with the regulator valve and the solenoid valve is operable to selectively actuate the regulator valve. A controller is in electronic communication with the solenoid valve, and the controller has control logic including a first control logic for measuring a transmission temperature, a second control logic for determining whether the transmission temperature is greater than or equal to a desired operating temperature, a third control logic for determining a currently selected gear ratio of the transmission, and a fourth control logic for overdriving at least one solenoid valve if the transmission has not achieved the desired operating temperature and the overdriving solenoid valve will not disrupt the operation of the transmission for the currently selected gear ratio. In addition to overdriving the current within the solenoid valve, the solenoid valve itself can be redesigned to further enhance the heating capability.

In another aspect of the present invention, the solenoid valve and regulator valve are replaced with a high flow solenoid valve which directly acts on the torque transmitting device.

In another aspect of the present invention overdriving the solenoid valve includes increasing the current through the solenoid valve such that the current is greater than a normal current applied to the solenoid valve to achieve the selected gear ratio.

In another aspect of the present invention overdriving the solenoid valve will not disrupt the operation of the transmission when the solenoid valve is already carrying a normal current in order to achieve the currently selected gear ratio.

In yet another aspect of the present invention overdriving the solenoid valve will not disrupt the operation of the transmission when the regulator valve is not in hydraulic communication with the torque transmitting device.

In yet another aspect of the present invention the solenoid valve is a variable bleed solenoid valve, a pulse width modulated valve, a variable force solenoid valve, or a direct acting high flow variable force solenoid valve.

The present invention also provides a method for heating a transmission.

In one aspect of the present invention, the transmission has at least one solenoid valve that hydraulically actuates a valve, and the method includes the steps of measuring a transmission temperature, determining whether the transmission temperature is greater than or equal to a desired operating temperature, determining a currently selected gear ratio of the transmission, and overdriving at least one solenoid valve if the transmission has not achieved the desired operating temperature and overdriving the solenoid valve will not disrupt the operation of the transmission operation for the currently selected gear ratio.

In another aspect of the present invention overdriving the solenoid valve includes increasing a current through the solenoid valve such that the current is greater than a normal current applied to the solenoid valve to achieve the maximum pressure and to maintain the selected gear ratio.

In yet another aspect of the present invention the method includes the step of overdriving the solenoid valve if the solenoid valve is already carrying the normal current in order to achieve the currently selected gear ratio.

In yet another aspect of the present invention the method includes the step of overdriving the solenoid valve if the regulator valve is not in hydraulic communication with the torque transmitting device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 4 is an exemplary solenoid valve control logic chart for a six-speed transmission according to the present invention.

DETAILED DESCRIPTION

The following description is merely exemplary in nature and is not intended to limit the present disclosure, application, or uses.

Figure 1:
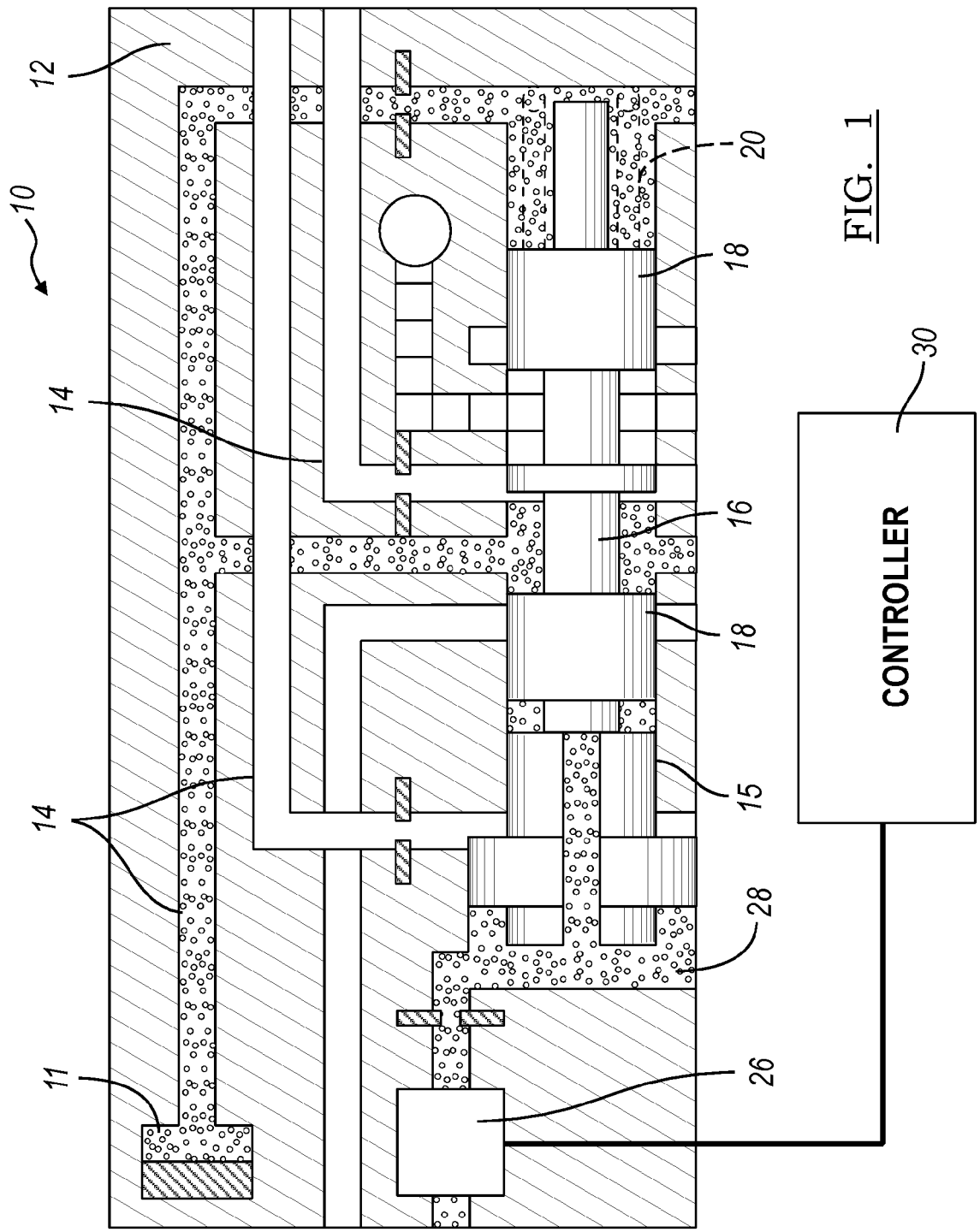
FIG. 1 is a schematic diagram of a portion of an exemplary hydraulic control system for a transmission using a transmission heating system according to the principles of the present invention.

With reference to FIG. 1, a portion of an exemplary hydraulic control system for a transmission is indicated by reference number 10. The hydraulic control system 10 is preferably employed in an automatic transmission having a park, a neutral, and a plurality of forward and reverse gear ratios. Each gear ratio is selected by engaging a combination of torque transmitting devices. These torque transmitting devices may take the form of clutches or brakes. The hydraulic control system 10 actuates or controls these torque transmitting devices within the transmission by regulating the hydraulic line pressure to these devices. In addition to controlling these devices, the hydraulic control system 10 provides lubrication and cooling fluids to various components of the transmission system. In the particular example provided, the hydraulic control system 10 provides hydraulic fluid to at least one actuatable device 11. The actuatable device 11 may take many forms, including a shift valve coupled to a torque transmitting device such as a friction clutch or brake, or any other device commonly found in a transmission hydraulic circuit.

The hydraulic control system 10 generally includes a hydraulic circuit 12. The hydraulic circuit 12 includes a plurality of passages or lines 14 that are used to transport pressurized hydraulic fluid from a hydraulic fluid source (not shown), such as a pump, to the various components of the transmission, including the actuatable device 11. The hydraulic fluid may also be used for lubrication and for cooling.

At least one regulator valve 15 is located within the hydraulic circuit 12. The regulator valve 15 includes a shaft 16 having a plurality of lands 18 mounted thereon. The regulator valve 15 is operable to restrict or allow the passage of hydraulic fluid to the actuatable device 11 by moving between various positions within the hydraulic circuit 12. For each position, the regulator valve 15 controls the passage of hydraulic fluid through the regulator valve 15, as will be described in greater detail below. The regulator valve 12 is biased to one of these positions by a biasing member 20.

At least one solenoid valve 26 is located within the hydraulic circuit 12. The solenoid valve 26 is in communication with a feeder line 28 that carries a pressurized hydraulic fluid from the hydraulic fluid source (not shown) to the regulator valve 15. The solenoid valve 26 is an electrically actuated valve that controls the line pressure of the hydraulic fluid downstream of the solenoid valve 26 by selectively inhibiting the flow of the hydraulic fluid through the solenoid valve 26. When the solenoid valve 26 is open, line pressure downstream of the solenoid valve 26 is at a maximum (approximately 130 psi for a typical six-speed transmission) and equal to the supply pressure from the hydraulic fluid source. When the solenoid valve 26 is closed, line pressure downstream of the solenoid valve 26 is at a minimum (typically zero psi). The solenoid valve 26 is actuated by an electrical current and is either a normally open or normally closed solenoid valve. The normally open solenoid valve provides maximum downstream pressure (the solenoid valve is open and not restricting fluid flow therethrough) when the current to the solenoid valve is zero. The normally open solenoid is also commonly referred to as a normally high solenoid valve. Applying current to the normally open solenoid valve restricts or closes the solenoid valve, thereby reducing downstream line pressure. The normally closed solenoid valve provides minimum downstream pressure (the solenoid valve is closed and restricting fluid flow therethrough) when the current to the solenoid valve is zero. The normally closed solenoid is also commonly referred to as a normally low solenoid valve. Applying current to the normally closed solenoid valve opens the solenoid valve, thereby increasing downstream pressure. Moreover, the solenoid valve may take various forms, such as a variable bleed solenoid valve (VBS), a variable force solenoid valve (VFS), an on/off solenoid valve, a pulse width modulated valve, or a direct acting/high flow solenoid valve. A VBS or VFS solenoid valve is operable to regulate downstream pressure through a range of values based on the current provided to the solenoid valve. An on/off solenoid valve is either fully opened or fully closed.

A controller 30 is in electrical communication with the solenoid valve 26. The controller 30 may be an engine controller or transmission controller, or any other electronic device having a preprogrammed digital computer or processor, control logic, memory used to store data, and at least one I/O section. The control logic includes a plurality of logic routines for monitoring, manipulating, and generating data. The controller 30 is also in communication with various sensors coupled to the transmission and engine, such as temperature sensors.

It should be appreciated that while only one regulator valve 15, one solenoid valve 26, and one actuatable device 11 have been illustrated, the transmission may include a plurality of these devices coupled together to form a complete control circuit operable to provide a plurality of gear ratios. Accordingly, the number of regulating valves 15, the number and type of solenoid valves 26, and the number and type of actuatable devices 11, as well as the arrangement of lines 14, will vary with the type of transmission. For example, in a 6-speed automatic transmission, the complete hydraulic control system 10 may include seven VBS solenoid valves including a line VBS solenoid valve and a torque converter clutch solenoid valve, and two on/off solenoid valves, all controlling five clutches.

Additionally, the actuatable device 11 can by directly hydraulically actuated by a high flow version of the solenoid valve 26. The high flow solenoid valve 26 replaces the regulator valve 15 and directly controls the pressure and flow to the torque transferring device 11.

During operation of the hydraulic control system 10 specific gear ratios require that certain combinations of torque transmitting devices be actuated. Accordingly, in order to actuate the actuatable device 11, pressurized fluid must be delivered through the hydraulic circuit 12 to the actuatable device 11. This is accomplished by actuating the regulator valve 15 to a specified open position such that the lands 18 of the regulator valve 12 do not block the lines 14 that feed the actuatable device 11. In the example provided, the regulator valve 15 is actuated to the open position when a pressurized hydraulic fluid in the feeder line 28 is allowed to pass through the solenoid valve 26 such that the pressurized fluid engages the regulator valve 15 and moves the regulator valve 15 against the biasing member 20. Accordingly, pressurized fluid is delivered to the regulator valve 15 when the solenoid valve 26 is in the open position. In the case of a normally open solenoid valve, this occurs when the solenoid valve 26 has not been energized by a current. In the case of a normally closed solenoid valve, this occurs when the solenoid valve 26 has been energized by a current. In either case, the controller 30 controls the actuation of the solenoid valve 26 using predefined and appropriate control logic based on the types of solenoid valves and positions of the regulator valves.

Figure 2:
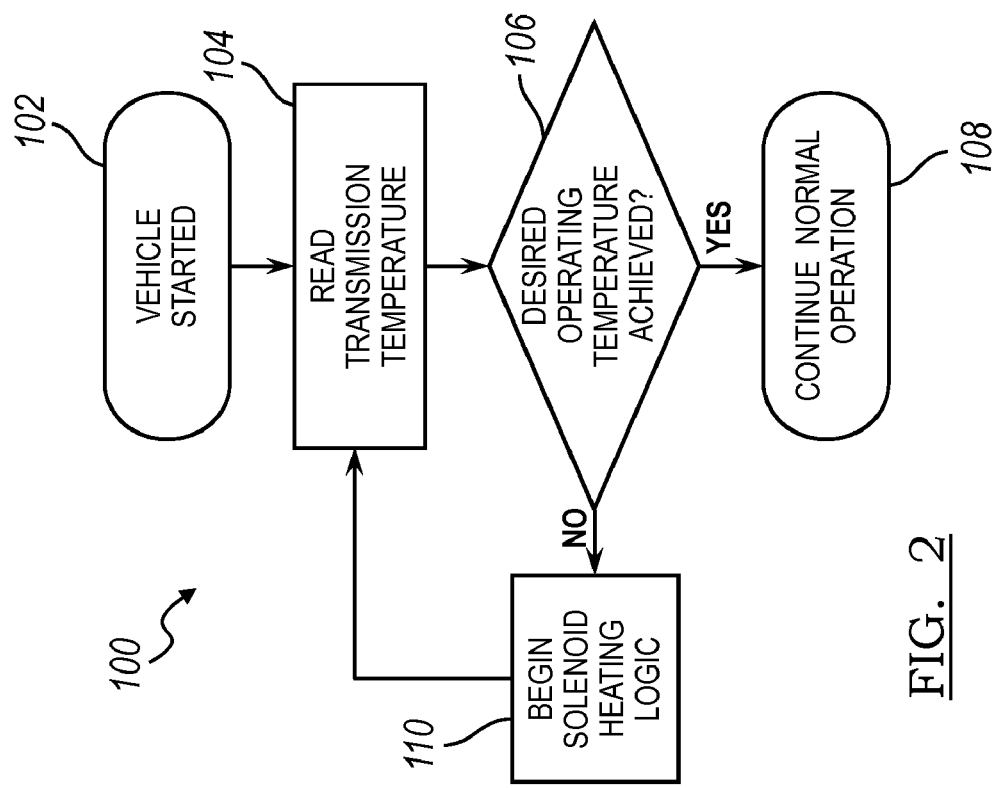
FIG. 2 is a flow chart illustrating a method for operating the transmission heating system of the present invention.

With reference to FIG. 2, a method for heating a transmission employing the hydraulic control system 10 is illustrated in flow-chart form and indicated by reference number 100. The method 100 will be described using one regulator valve 15 and one solenoid valve 26 for exemplary purposes, however, it should be appreciated that the method 100 may employ as many of the regulator valves 15 and the solenoid valves 26 that are within the transmission. The method 100 begins at step 102 when the motor vehicle engine is first started. Then, the controller 30 reads the current temperature of the transmission at step 104 from one or more temperature sensors located throughout the transmission.

At step 106, the controller compares the current temperature of the transmission to a desired operating temperature. The desired operating temperature is a pre-defined set value, and may vary between applications, for example ranging from −40 degrees Celsius to 150 degrees Celsius). If the current temperature is greater than or equal to the desired operating temperature, then the method 100 proceeds to step 108 where normal transmission operation continues.

If the current temperature is less than the desired operating temperature, the method proceeds to step 110 where a solenoid valve heating control logic routine begins. The solenoid valve heating control logic at step 110 serves to selectively overdrive specific solenoid valves without affecting the normal operation of the transmission. By overdriving the solenoid valves, the solenoid valves give off excess heat that is transmitted to the hydraulic fluid. This in turn rapidly increases the current operating temperature of the transmission. During the solenoid valve heating logic routine at step 110, the method continues to repeat steps 104 and 106. When the current transmission temperature achieves the desired operating temperature, the solenoid valve heating logic routine 110 terminates and the method proceeds to step 108 where the transmission operates normally.

Figure 3:
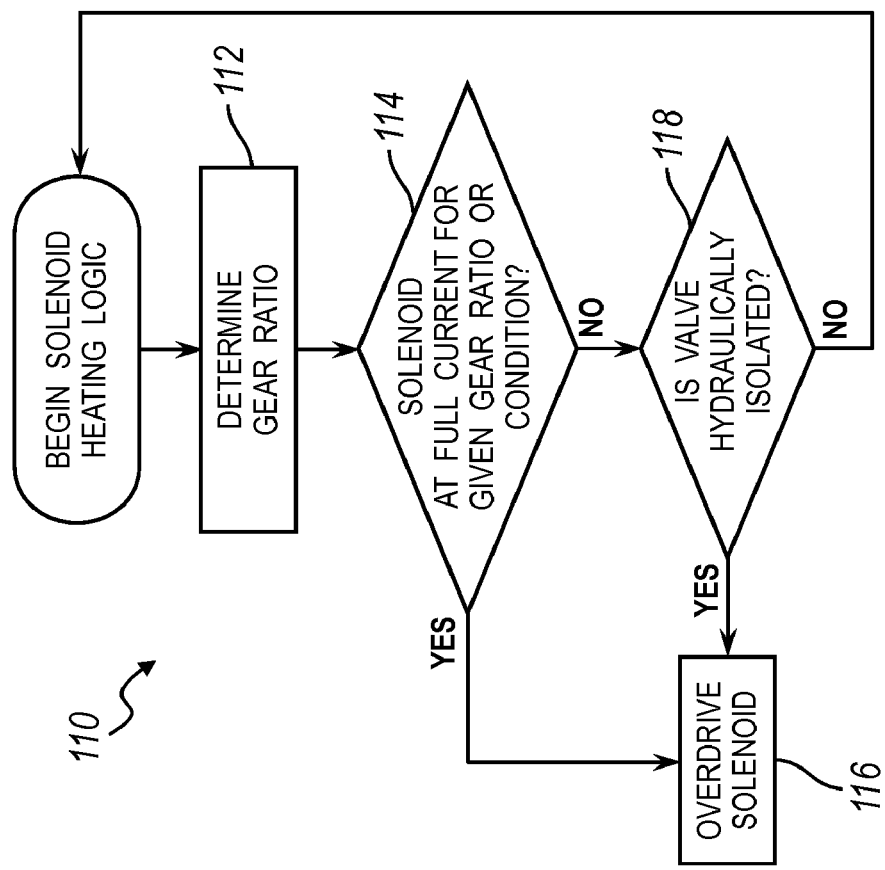
FIG. 3 is a flow chart of a solenoid valve heating control logic used in the transmission heating system of the present invention.

Turning now to FIG. 3, the solenoid valve heating logic routine 110 will be described in further detail. The solenoid valve heating logic routine begins at step 112 where the controller 30 determines the currently selected gear ratio of the transmission. Next, the controller 30 uses the currently selected gear ratio to determine whether the solenoid valve 26 is being energized at full normal current. If the solenoid valve 26 is being energized at full normal current, the solenoid valve 26 is overdriven at step 116. The solenoid valve 26 is overdriven by preferably increasing the current through the solenoid valve 26 to a value greater than the full current applied to the solenoid valve 26 to achieve the selected gear ratio. As most solenoid valves are designed to carry currents greater than the full normal current used to achieve the selected gear ratio, overdriving the solenoid valve will not damage the solenoid valve or the transmission. In the particular example provided, the solenoid valve 26 is overdriven by doubling the full normal current, though various levels of current may be employed without departing from the scope of the present invention. As the current is increased through the solenoid valve 26, resistance heating occurs, and the current operating temperature of the transmission increases. Alternatively, rather than increasing the current through the solenoid valve 26, the resistance of the solenoid valve 26 may be increased. However some solenoid valves 26 may be redesigned to enable this feature and withstand the higher currents and further enhance the desired heating characteristics.

If the solenoid valve 26 is not at full normal current for the given gear ratio, then the controller 30 then determines whether the regulator valve 15 that is actuated by the solenoid valve 26 is hydraulically isolated for the given gear ratio. The regulator valve 15 is hydraulically isolated when the regulator valve is not in hydraulic communication with the torque transmitting device even if the regulator valve 15 is in an open position such that the lines 14 are not closed off by the lands 18 of the regulator valve 15. Hydraulic isolation of the regulator valve 15 can occur due to the positions of various other shift valves, regulator valves or solenoid valves within the hydraulic circuit 12 upstream of the regulator valve 15. If the regulator valve 15 is hydraulically isolated, then overdriving the solenoid valve 26 will not affect the actuatable device 11, and the solenoid valve heating logic routine 110 proceeds to step 116 where the solenoid valve 26 is overdriven.

If the regulator valve 15 is not hydraulically isolated, then the solenoid valve heating logic routine 110 repeats. Over time, the current gear ratio may change and solenoid valves may become fully energized or regulator valves may become hydraulically isolated, thus allowing specific solenoid valves to be overdriven.

With reference to FIG. 4, an exemplary solenoid valve heating chart is shown for a six-speed transmission. For each given gear ratio, a specific solenoid valve is indicated whether it can be overdriven. Additionally, for each solenoid valve and each gear ratio, a specific controlling limitation or factor is listed. These limitations are used to help determine when the solenoid valve may be overdriven.

For example, in neutral, the solenoid valve labeled C1 VBS is limited in that it is a normally closed solenoid valve and controls a valve that is hydraulically isolated when the current gear ratio is neutral. Accordingly, C1 VBS may be overdriven. The solenoid valve labeled C2/C5 VBS is limited in that it is a normally open solenoid valve and the solenoid valve is controlling (i.e., the solenoid valve is open and providing pressurized fluid to the respective regulator valve). Accordingly, the C2/C5 VBS is not at full current and cannot be overdriven when in neutral. The solenoid valve labeled C3 VBS is limited in that it is a normally open solenoid valve and the solenoid valve is off (i.e. the solenoid valve is closed and restricting pressurized fluid from passing to the respective regulator valve). Therefore, the C3 VBS is at full current and may be overdriven. The solenoid valve labeled C4 VBS is limited in that it is a normally closed solenoid valve and controls a valve that is hydraulically isolated when the current gear ratio is neutral. Accordingly, C4 VBS may be overdriven. The solenoid valve labeled Line VBS is a normally open solenoid valve is limited in that it may only be overdriven when minimum line pressure downstream of the solenoid valve is desired. The solenoid valve labeled TCC VBS is limited in that it may only be overdriven when the transmission will not be starved of cooler or lubrication fluids by overdriving the solenoid valve (lube dependent) and the regulator valve is hydraulically isolated (no TCC Apply). The solenoid valves labeled Solenoid valve 2 and Solenoid valve 3 are on/off solenoid valves and may be overdriven when in the "on" position (e.g. the solenoid valves are at full current).

In first gear, the C1 VBS is limited in that it is a normally closed solenoid valve and may be overdriven when the correspondingly controlled clutch has already been applied. The C2/C5 VBS is limited in that it is a normally open solenoid valve and the solenoid valve is controlling (i.e., the solenoid valve is open and providing pressurized fluid to the respective regulator valve). Accordingly, the C2/C5 VBS is not at full current and cannot be overdriven when in first gear. The C3 VBS is limited in that it is a normally open solenoid valve and the solenoid valve is off (i.e. the solenoid valve is closed and restricting pressurized fluid from passing to the respective regulator valve). Therefore, the C3 VBS is at full current and may be overdriven. The C4 VBS is limited in that it is a normally closed solenoid valve and the solenoid valve is off (i.e. the solenoid valve is closed and restricting pressurized fluid from passing to the respective regulator valve). Accordingly, C4 VBS may not be overdriven. The Line VBS is a normally open solenoid valve is limited in that it may only be overdriven when minimum line pressure downstream of the solenoid valve is desired. The TCC VBS is limited in that it may only be overdriven when the torque converter clutch is already fully applied or locked and accordingly the solenoid valve may be overdriven without affecting the engagement of the torque converter clutch. The Solenoid valve 2 may be overdriven when the torque converter clutch is fully applied or locked or when the torque converter clutch is off. Solenoid valve 3 may be overdriven when in the "on" position (e.g. the solenoid valves are at full current). The remaining gear ratios follow a similar pattern as illustrated in the chart.

The description of the invention is merely exemplary in nature and variations that do not depart from the gist of the invention are intended to be within the scope of the invention. Such variations are not to be regarded as a departure from the spirit and scope of the invention.

What is claimed is:

1. A system for heating a transmission comprising:
   an actuatable device;
   at least one solenoid valve in hydraulic communication with the actuatable device, the solenoid valve operable to selectively actuate the actuatable device;
   a controller in electronic communication with the solenoid valve, the controller having control logic including a first control logic for measuring a transmission temperature, a second control logic for determining whether the transmission temperature is greater than or equal to a desired operating temperature, a third control logic for determining a currently selected gear ratio of the transmission, and a fourth control logic for overdriving the solenoid valve if the transmission has not achieved the desired operating temperature and if overdriving the solenoid valve will maintain the currently selected gear ratio.

2. The system of claim 1 further comprising at least one regulator valve in selective hydraulic communication with the actuatable device and the solenoid valve, wherein the solenoid valve selectively actuates the actuatable device by hydraulically actuating the regulator valve.

3. The system of claim 2 wherein overdriving the solenoid valve includes increasing an electrical current through the solenoid valve such that the electrical current is greater than a normal current applied to the solenoid valve used to maintain the currently selected gear ratio.

4. The system of claim 3 wherein overdriving the solenoid valve will not shift the transmission from the currently selected gear ratio when the solenoid valve is already carrying a normal current in order to achieve the currently selected gear ratio.

5. The system of claim 4 wherein overdriving the solenoid valve will not shift the transmission from the currently selected gear ratio when the regulator valve is hydraulically isolated from the actuatable device.

6. The system of claim 5 wherein the solenoid valve is a variable bleed solenoid valve.

7. The system of claim 5 wherein the solenoid valve is an on/off solenoid valve.

8. The system of claim 5 wherein the solenoid valve is a pulse width modulated valve.

9. The system of claim 5 wherein the solenoid valve is a variable force solenoid valve.

10. The system of claim 5 wherein the actuatable device is a torque converter clutch.

11. The system of claim 5 wherein the actuated device is a shift valve.

12. The system of claim 1 wherein the solenoid valve is a direct acting high flow solenoid valve.

13. A method for heating a transmission, the transmission having at least one solenoid valve that hydraulically actuates a device, the method comprising the steps of:
    measuring a transmission temperature;
    determining whether the transmission temperature is greater than or equal to a desired operating temperature;
    determining a currently selected gear ratio of the transmission; and
    overdriving at least one solenoid valve if the transmission has not achieved the desired operating temperature and if overdriving the solenoid valve will maintain the currently selected gear ratio.

14. The method of claim 13 wherein overdriving the solenoid valve includes increasing an electrical current through the solenoid valve such that the electrical current is greater than a normal current applied to the solenoid valve to maintain the currently selected gear ratio.

15. The method of claim 14 wherein overdriving the solenoid valve increases a temperature of the transmission by increasing a temperature of the solenoid valve.

16. The method of claim 15 further comprising the step of overdriving the solenoid valve if the solenoid valve is already carrying the normal current to maintain the currently selected gear ratio.

17. The method of claim 16 further comprising the step of overdriving the solenoid valve if the solenoid valve is hydraulically isolated from the device.

18. The method of claim 17 wherein the solenoid valve is a variable bleed solenoid valve.

19. The method of claim 17 wherein the solenoid valve is an on/off solenoid valve.

20. The method of claim 17 wherein the solenoid valve is a pulse width modulated valve.

21. The method of claim 17 wherein the solenoid valve is a variable force solenoid valve.

22. The method of claim 17 wherein the solenoid valve is a direct acting high flow solenoid valve.

23. The method of claim 17 wherein the device is a torque converter clutch.

24. The method of claim 17 wherein the device is a shift valve.

* * * * *